Jan. 19, 1965  J. E. WALDRUM  3,165,859
DRY FEEDER SPRAY APPARATUS
Filed Oct. 10, 1961
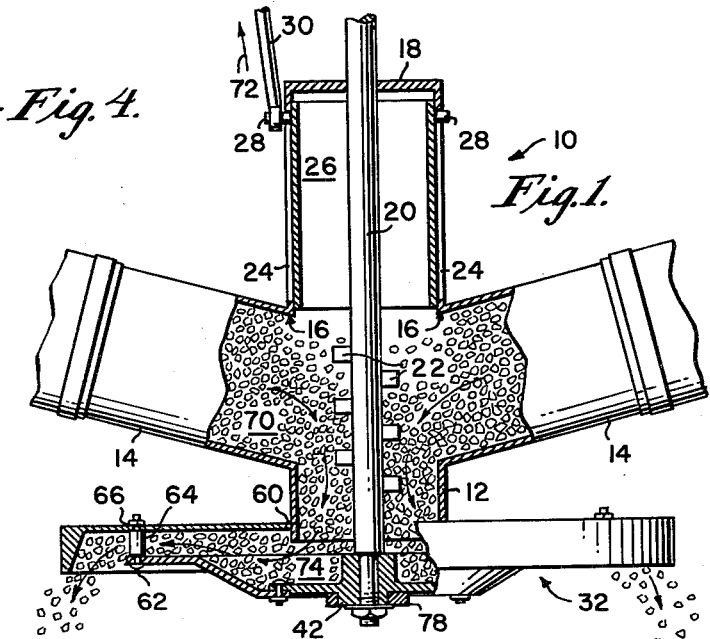
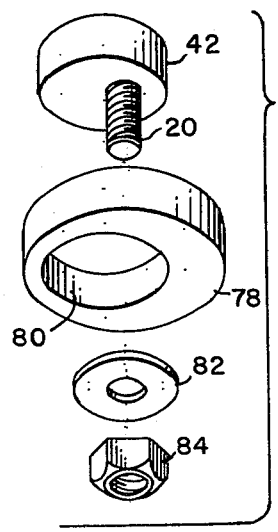
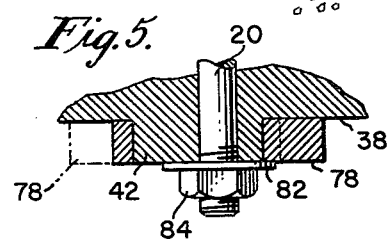
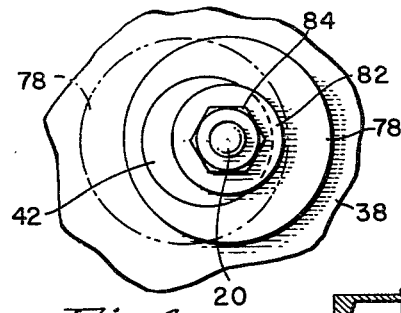
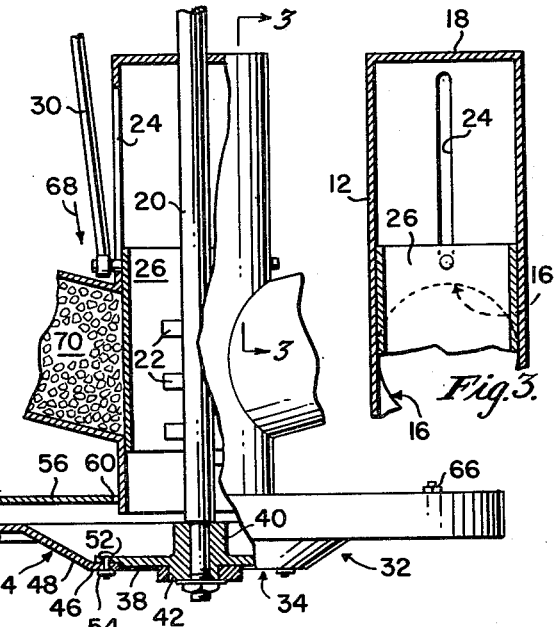
INVENTOR.
JOHN E. WALDRUM
BY
Caesar and Rivise
ATTORNEYS.

3,165,859
DRY FEEDER SPRAY APPARATUS
John E. Waldrum, Ambler, Pa., assignor to Amchem
Products, Inc., Ambler, Pa., a corporation of Delaware
Filed Oct. 10, 1961, Ser. No. 144,191
1 Claim. (Cl. 43—145)

This invention relates to a dispensing device for distributing particulate solid material and is especially adapted for use on either rotary or fixed wing aircraft as an aerial applicator of plant growth regulants, herbicides, insecticides, and other agricultural preparations.

This application is a continuation-in-part of application Serial No. 130,994, filed August 11, 1961, and entitled Centrifugal Spray Device.

An important object of this invention is to provide a dispensing device of the character described which employs a disc assembly for receiving and discharging particles. The disc assembly includes an upper and a lower plate which are mounted in a fixed relationship, thereby providing a pre-determined separation of plates to permit the discharge of particles from between the plates. The feed of particles to the plates is controlled by the raising and lowering of a sleeve valve maintained within the feed conduit and associated with the plates. The sleeve valve regulates the amount of material entering the feed conduit.

The instant distributing device differs from that disclosed and claimed by prior application Serial No. 130,994, filed August 11, 1961, in a number of respects.

In the first place, the disc assembly of the prior apparatus included upper and lower plates which were resiliently connected to each other. The centrifugal force of the particles within the disc assembly generated when the assembly was rotated caused the plates to separate and thereby discharge the particles therefrom.

In the instant device, the plates of the disc assembly are maintained at a fixed relationship to each other. Thus upon the rotation of the disc assembly, neither disc is actuated with respect to the other by the function of the apparatus.

Secondly, the amount of material fed to the disc assembly in my prior application was not easily controlled.

In the instant application, the feed can be accurately controlled by means of a sleeve valve within the feed conduit connected to the disc assembly.

It thus becomes apparent that in the centrifugal spray device of my prior application the amount of material discharged from the device is directly dependent upon the rate of rotation of the disc assembly. In the instant invention, the amount of discharge can be maintained completely independent of the rate of rotation of the disc assembly.

It is, therefore, an object of this invention to provide the novel particulate material distributor.

It is another object of this invention to provide a particulate material distributor which sprays in such a manner that material departs from the sprayer at the lowest point of the structure, whereby the sprayer does not interfere with the pattern of the spray particles.

It is a further object of this invention to provide a particulate material distributor that includes agitating means to prevent any agglomeration of any sticky materials.

It is yet a further object of this invention to provide a particulate material distributor wherein the feed tube remains stationary while the distributing head is rotating.

It is yet a further object of this invention to provide a particulate material distributor wherein the amount of material discharged from the distributing head can be maintained completely independent of the rotational speed of the distributing head.

These and other objects are obtained by providing a dry feeder spray apparatus comprising a distributing chamber, a feed tube associated with said chamber, a shaft for rotating said chamber, and a sleeve valve within said feed tube for regulating the amount of material fed to said feed tube.

Other objects and many of the attendant advantages of this invention will be readily appreciated as the same becomes better understood by reference to the following detailed description when considered in connection with the accompanying drawings wherein:

FIG. 1 is a front elevational view of an embodiment of the present invention with parts being broken away to show internal construction in section, and with the sleeve valve being in open position;

FIG. 2 is a front elevational view similar to FIG. 1, but with the sleeve valve in the closed position;

FIG. 3 is a sectional view taken along the lines 3—3 of FIG. 2;

FIG. 4 is an enlarged exploded perspective view of the elements constituting the vibratory assembly for the disc assembly;

FIG. 5 is a sectional view of the elements of FIG. 4 in assembled form and showing another position of the counterweight in phantom; and, FIG. 6 is a plan view of the disc assembly of FIG. 5, taken from the bottom thereof, and showing another position of the counterweight in phantom.

Referring now in greater detail to the various figures of the drawings wherein similar reference characters refer to similar parts, a dry feeder spray apparatus embodying the present invention is generally shown at 10 in FIG. 1. Device 10 basically comprises a central feed tube 12 having generally opposed feed channels 14 which are downwardly inclined and which enter feed tube 12 at the sides thereof through ports 16. Although two feed channels 14 are shown, any desired number of channels including one may be employed. Two channels can be used when large amounts of solids are to be supplied or when two different particulate compositions are to be supplied and ultimately mixed in feed tube 12.

The top of feed tube 12 is sealed by plate 18, which is integral with the cylindrical surface of the feed tube. Shaft 20 is journaled within plate 18, and is driven by a suitable drive means, such as a motor (not shown). A plurality of radially extending spaced agitator blades or paddles 22 project from shaft 20. These paddles can be used to break down any agglomerates which may form when sticky materials are being used. Otherwise these agglomerates might form a barrier to the free flow of the material to the disc assembly. Paddles 22 can also serve the function of mixing or forming a homogeneous mixture when two different compositions are fed through feed channels 14.

Central feed tube 12 contains two opposed longitudinal slots 24 (FIGS. 1 and 3) in the upper half of the cylindrical surface thereof. Each slot 24 extends upwardly from a point just above ports 16 to a point just below upper plate 18. A cylindrical sleeve 26 slidably engages the interior cylindrical walls of feed tube 12. Sleeve 26 is prevented from rotating by pins 28 (FIG. 1) which are secured to the sleeve 26 and project outwardly through slots 24. A control shaft 30 (FIG. 1) is secured to one of the pins 28 whereby the raising or lowering of the control shaft 30 will result in the raising or lowering of sleeve 26 within feed tube 12. The purpose of this raising and lowering will be explained hereinafter. Control shaft 30 is connected by any suitable mechanism to the cockpit of the airplane whereby the raising and lowering of the sleeve can be readily controlled by the pilot.

A disc assembly 32 (FIGS. 1 and 2) is keyed, or otherwise secured, to shaft 20 for rotation therewith. Disc assembly 32 basically comprises a lower plate 34 and an upper plate 36. Lower plate 34 includes a central disc 38 having a centrally located upwardly projecting hub 40 which is integral with said disc. Central disc 38 also includes an integral downwardly extending, eccentrically located boss 42. Shaft 20 projects through disc 38, hub 40 and boss 42. The purpose of the eccentricity of boss 42 will be explained hereinafter.

Secured to the outer circumference of disc 38 is a dish-shaped wall 44. Wall 44 comprises an inner rim 46, an inclined portion 48 which extends upwardly and outwardly from rim 46 and peripheral flange 50 on the outer end of the inclined portion. As seen in FIGS. 1 and 2 the dish-shaped wall 44 is unitary. The wall 44 is secured to the central disc 38 by means of bolts 52 and associated nuts 54 which pass through the outer circumference of the central disc 38 and inner rim 46 of wall 44.

It is thus seen that lower plate 34 comprises central disc 38 and dish-shaped wall 44.

Upper plate 36 comprises disc 56 having flange 58 integral therewith and projecting perpendicularly downward therefrom. Disc 56 also has a centrally located circular hole 60 through which tube 12 projects.

Upper plate 36 is secured to lower plate 34 for rotation therewith by means of bolts 62 which pass through both the lower plate and the upper plate. A pre-determined distance is maintained between the plates by means of spacer sleeves 64 which are telescoped over the bolts and are positioned between the plates. Nuts 66 are used to hold the bolts in place.

FIG. 2 shows the spray device of this invention prior to use. It should be noted that sleeve valve 26 in FIG. 2 is closed, which closing is accomplished by pushing shaft 30 in the direction of arrow 68. When the valve is closed, ports 16 are sealed, thereby preventing any of the particulate solid material 70 from entering feed tube 12 via channels 14. When it is desired to operate the device, sleeve valve 26 is raised to the position of FIG. 1 by pulling shaft 30 in the direction of arrow 72. This permits particulate material 70 to fall into the well 74 formed by disc 38 and upwardly inclined portion 48 of wall 44. The motor, or other suitable drive means, is then energized and the disc assembly 32 is rotated via shaft 20. The particulate material in well 74 is caused to swirl around by the centrifugal force of rotation, thereby creating a sufficient centrifugal force or momentum to cause the particulate material in the well to flow out of the disc assembly in the direction of the arrows in FIG. 1. If it is desired to decrease the amount of particulate material emanating from the spray device, the sleeve 26 is lowered to the desired position intermediate to that of FIGS. 1 and 2. Thus, the amount of material being discharged can be accurately controlled by controlling the size of the opening of ports 16. The amount of material being discharged can additionally be controlled by the rpm of the disc assembly.

As is apparent, the diameter of hole 60 is slightly larger than outer diameter of feed tube 12.

Thus, it should be noted that disc assembly 32 does not contact feed tube 12 in any way. Hence, when disc assembly 32 is rotated, feed tube 12 remains stationary. Also, feed tube 12 protrudes into well 74 at a sufficient depth to prevent any loss of material through hole 60.

In the embodiment illustrated, flange 58 of upper plate 36 depends at an angle of approximately 90° to the horizontal disc 56. The interior surface 76 of flange 58 depends at an angle of approximately 60°. This angle tends to deflect material being sprayed downward, thus partially eliminating the undesirable side drift of the material being sprayed. If side drift of the material being sprayed is not a factor, obviously the flange can be eliminated. Likewise, the angle of the interior surface can be increased up to 90°, if necessary.

As previously pointed out, central disc 38 has a integral dependent eccentrically located boss 42, through which shaft 20 projects (FIG. 4).

Surrounding boss 42 is a counterbalancing disc 78, having eccentrically located hole 80 substantially equal in diameter to the outer diameter of boss 42. The thickness of the disc 78 is equal to that of the boss 42 as indicated in FIG. 5. The disc is secured in place by washer 82 and nut 84 threaded on the bottom of shaft 20. The nut and washer serve the additional function of supporting lower plate 32.

The function of the eccentric boss 42 and counterbalancing disc 78 will now be explained. As previously pointed out when sticky materials are being used, agglomerates tend to form. These agglomerates are broken up in the feed tube by agitating paddles 22. In order to keep the sticky materials in particulate form when in well 74, it is necessary to vibrate disc assembly 32. This is accomplished by merely adjusting counterweight 78 to a set eccentric as shown in phantom at 78' in FIGS. 5 and 6. Thus eccentricity will cause an imbalance in lower plate 34, which will in turn cause disc assembly 32 to vibrate when rotated. When non-agglomerating materials are used, the imbalance can be eliminated by shifting the counterweight 78 to the position shown in FIGS. 1, 5 and 6. This results in having shaft 20 eccentrically located with respect to lower plate 34. Thus, any eccentricity placed on the left of shaft 20 by boss 42 is counterbalanced by the eccentricity caused by disc 78 on the right of shaft 20.

Obviously, many modifications and variations of the present invention are possible in the light of the above teachings. For instance, boss 42 need not be integral with disc 38, but can be an abutting disc with an eccentric hole therein. It is, therefore, to be understood that within the scope of the appended claim, the invention may be practiced otherwise than as specifically described.

What is claimed as the invention is:

A dry feeder spray apparatus comprising a disc assembly including an upper plate and a lower plate connected to each other in a constant, spaced, face-to-face relationship to form a chamber therebetween, conduit means opening into said chamber between said plates to deliver particulate material to said chamber, at least one feed channel associated with said conduit means for delivering particulate material thereto, a sleeve valve within said conduit means, means for raising and lowering said sleeve valve within said conduit means to thereby control the amount of material delivered from said feed channel into said conduit means, a shaft secured to said lower plate for rotating said disc assembly, agitating and vibrating means associated with said shaft and including a boss associated with said lower plate, said boss being eccentrically located with respect to said shaft, and a disc counterbalancing said boss, said disc having an ececntric hole therein, said disc telescopingly engaging said boss through said hole, whereby said disc and said boss are positioned in counterbalancing relationship with respect to each other.

References Cited in the file of this patent

UNITED STATES PATENTS

| | | |
|---|---|---|
| 368,399 | Hubbell | Aug. 16, 1887 |
| 592,774 | Frazier | Nov. 2, 1897 |
| 1,392,345 | Lowe | Oct. 4, 1921 |
| 1,674,391 | Dunnagan | June 19, 1928 |
| 1,755,445 | Irish | Apr. 22, 1930 |
| 2,917,241 | Waldrum | Dec. 15, 1959 |
| 2,990,011 | Stratford | June 27, 1961 |
| 3,079,050 | Wahl | Feb. 26, 1963 |